(12) United States Patent
Pakrooh et al.

(10) Patent No.: US 12,556,226 B2
(45) Date of Patent: Feb. 17, 2026

(54) LOW-DENSITY PARITY-CHECK (LDPC) CODEWORD SELECTION FOR ULTRA-WIDEBAND (UWB)

(71) Applicant: QUALCOMM Incorporated, San Diego, CA (US)

(72) Inventors: Pooria Pakrooh, San Diego, CA (US); Kanke Wu, San Diego, CA (US); Stephen Jay Shellhammer, Ramona, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 18/362,127

(22) Filed: Jul. 31, 2023

(65) Prior Publication Data

US 2024/0146355 A1    May 2, 2024

Related U.S. Application Data

(60) Provisional application No. 63/381,123, filed on Oct. 26, 2022.

(51) Int. Cl.
*H04B 1/7163* (2011.01)
*H03M 13/25* (2006.01)

(52) U.S. Cl.
CPC ...... *H04B 1/71635* (2013.01); *H03M 13/255* (2013.01)

(58) Field of Classification Search
CPC .................................... H04B 1/71635
USPC .................................................. 375/130
See application file for complete search history.

(56) References Cited

U.S. PATENT DOCUMENTS

| | | | |
|---|---|---|---|
| 2004/0170121 A1* | 9/2004 | Kim | H04B 1/69 370/479 |
| 2013/0013983 A1 | 1/2013 | Livshitz et al. | |
| 2015/0149851 A1 | 5/2015 | Eroz et al. | |
| 2017/0264320 A1* | 9/2017 | Lin | H03M 13/618 |

(Continued)

FOREIGN PATENT DOCUMENTS

EP    2963829 A1    1/2016

OTHER PUBLICATIONS

International Search Report and Written Opinion—PCT/US2023/074924—ISA/EPO—Jan. 15, 2024.

(Continued)

*Primary Examiner* — Lihong Yu

(74) *Attorney, Agent, or Firm* — Holland & Hart LLP

(57) ABSTRACT

In some implementations, a transmitting UWB device may determine a number of information bits of a payload to communicate via UWB. The transmitting UWB device may select, based on the number of information bits, a codeword length from a selection of available codeword lengths with which to encode the payload using a low-density parity-check (LDPC) encoding scheme, wherein the selection of available codeword lengths include a first codeword length, a second codeword length, and a third codeword length, wherein the third codeword length is longer than the second codeword length, which is longer than the first codeword length. The transmitting UWB device may transmit the payload using one or more codewords having the selected codeword length.

18 Claims, 9 Drawing Sheets

(56) References Cited

U.S. PATENT DOCUMENTS

2023/0141358 A1* 5/2023 Aldana ................ H04B 1/7163 375/130
2024/0031853 A1* 1/2024 Shirakawa ............ H04W 76/15

OTHER PUBLICATIONS

Akhavan K., et al., "A Higher Data Rate Proposal for UWB", IEEE P802.15 Working Group for Wireless Personal Area Networks (WPANs), doc: IEEE 802.15-22-0296-00-04ab, May 2022, 18 Pages.

Aldana C., "Advanced Coding for Data Communications in 802.15.4ab", IEEE P802.15 Working Group for Wireless Personal Area Networks (WPANs), doc: IEEE 15-21-0506-02-04ab, Nov. 2021, 27 Pages.

Aldana C., et al., "Advanced Coding for Data Communications in 802.15.4ab", IEEE P802.15 Working Group for Wireless Personal Area Networks (WPANs), doc: IEEE 15-21-0506-03-04ab, Jun. 2022, 35 Pages.

Aldana C., et al., "High Data Rates and Coding", IEEE P802.15 Working Group for Wireless Personal Area Networks (WPANs), doc: 15-22-0274-00-04ab, May 2022, 5 Pages.

Gu J., et al., "Further Considerations of Advanced Channel Coding on 15.4ab", IEEE P802.15 Working Group for Wireless Personal Area Networks (WPANs), doc: 15-21-XXXX-00-04ab, Mar. 2022, 14 Pages.

Lin W., et al., "Channel Coding Considerations for 802.15.4ab", IEEE P802.15 Working Group for Wireless Personal Area Networks (WPANs), doc: 15-22-0050-00-04ab, Jan. 2022, 16 Pages.

Lin W., et al., "Discussion on Advanced Channel Coding for 15.4ab", IEEE P802.15 Working Group for Wireless Personal Area Networks (WPANs), doc: 15-21-XXXX-00-04ab, Mar. 2022, 8 Pages.

Lin W., et al., "Preliminary Discussion on Possible LDPC Codes for 15.4ab", IEEE P802.15 Working Group for Wireless Personal Area Networks (WPANs), doc: 15-22-XXXX-00-04ab, Jun. 2022, 14 Pages.

Lin W., et al., "New Results on Possible LDPC Codes for 15.4ab", IEEE P802.15 Working Group for Wireless Personal Area Networks (WPANs), doc.: 15-22-0506-01-04ab, Sep. 2022, 31 pages.

Murray C., et al., "High Data Rates", IEEE P802.15 Working Group, doc: IEEE 15-21-0592-00-04ab, Nov. 2021, 18 Pages.

Murray C., et al., "New Data Rates", IEEE P802.15 Working Group for Wireless Specialty Networks (WSN), doc: IEEE 15-22-0181-01-04ab, Mar. 2022, 18 Pages.

* cited by examiner

| | Bits: 0-1 | 2-8 | 9 | 10 | 11-12 | 13-18 |
|---|---|---|---|---|---|---|
| Legacy, BPRF | Data rate | Frame length | Ranging | Reserved | Preamble duration | SECDED |

210

| | Bits: 0 | 1 | 2-11 | 12 | 13-18 |
|---|---|---|---|---|---|
| HPRF | A1 | A0 | PHY payload length | Ranging | SECDED |

| Information bits | LDPC length ($L_{LDPC}$) | Note | Coded length ($N_{Coded}$) |
|---|---|---|---|
| $1 \leq N_{pld} \leq 324$ | 648 | Single codeword | $325 \leq N_{Coded} \leq 648$ |
| $325 \leq N_{pld} \leq 648$ | 1296 | Single codeword | $973 \leq N_{Coded} \leq 1296$ |
| $649 \leq N_{pld}$ | 1944 | As many as needed | $1621 \leq N_{Coded}$ |

FIG. 3

| Information bits | LDPC length ($L_{LDPC}$) | Note | Coded length ($N_{Coded}$) |
|---|---|---|---|
| $1 \leq N_{pld} \leq 324$ | 648 | Single codeword | $325 \leq N_{Coded} \leq 648$ |
| $325 \leq N_{pld} \leq 648$ | 1296 | Single codeword | $973 \leq N_{Coded} \leq 1296$ |
| $649 \leq N_{pld} \leq 972$ | 1944 | Single codeword | $1621 \leq N_{Coded} \leq 1944$ |
| $973 \leq N_{pld} \leq 1296$ | 2 x 1296 | Two codewords | $2269 \leq N_{Coded} \leq 2592$ |
| $1297 \leq N_{pld}$ | K x 1944 | As many as needed | $3241 \leq N_{Coded}$ |

| Information bits | LDPC length ($L_{LDPC}$) | Note | Coded length ($N_{Coded}$) |
|---|---|---|---|
| $1 \leq N_{pld} \leq 324$ | 648 | Single codeword | $325 \leq N_{Coded} \leq 648$ |
| $325 \leq N_{pld} \leq 648$ | 1296 | Single codeword | $973 \leq N_{Coded} \leq 1296$ |
| $649 \leq N_{pld} \leq 972$ | 1944 | Single codeword | $1621 \leq N_{Coded} \leq 1944$ |
| $973 \leq N_{pld} \leq 1296$ | 2 x 1296 | Two codewords | $2269 \leq N_{Coded} \leq 2592$ |
| $1297 \leq N_{pld}$ | Length 1296 if $[N_{pld}/648] \times 648 < [N_{pld}/972] \times 972$ Length 1944 otherwise | As many as needed | $3241 \leq N_{Coded}$ |

FIG. 5

LOW-DENSITY PARITY-CHECK (LDPC) CODEWORD SELECTION FOR ULTRA-WIDEBAND (UWB)

RELATED APPLICATIONS

This application claims the benefit of U.S. Provisional Application No. 63/381,123, filed Oct. 26, 2022, entitled "LDPC CODEWORD SELECTION FOR NEXT GENERATION UWB STANDARDS", which is assigned to the assignee hereof, and incorporated herein in its entirety by reference.

BACKGROUND

1. Field of Disclosure

The present disclosure relates generally to the field of wireless communications, and more specifically to ultra-wideband (UWB) communication.

2. Description of Related Art

UWB is a wireless technology that has been utilized to perform high-accuracy positioning, especially indoors. However, UWB has become an increasingly attractive option for close-range data communication, in specific applications. Because data communication has not been a traditional focus of UWB, UWB uses a relatively basic coding design that may limit data rates for UWB communication.

BRIEF SUMMARY

An example method of ultra-wideband (UWB) communication, according to this disclosure, may comprise determining, at a transmitting UWB device, a number of information bits of a payload to communicate via UWB. The method also may comprise selecting, at the transmitting UWB device and based on the number of information bits, a codeword length from a selection of available codeword lengths with which to encode the payload using a low-density parity-check (LDPC) encoding scheme, wherein the selection of available codeword lengths include a first codeword length, a second codeword length, and a third codeword length, wherein the third codeword length is longer than the second codeword length, which is longer than the first codeword length. The method also may comprise transmitting, from the UWB transmitting device, the payload using one or more codewords having the selected codeword length.

An example method of ultra-wideband (UWB) communication, according to this disclosure, may comprise receiving, at a receiving UWB device, a payload having one or more codewords transmitted via UWB communication by a transmitting UWB device, the payload having a number of information bits. The method also may comprise selecting, at the receiving UWB device and based on the number of information bits, a codeword length from a selection of available codeword lengths with which to decode the payload using a low-density parity-check (LDPC) decoding scheme, wherein the selection of available codeword lengths include a first codeword length, a second codeword length, and a third codeword length, wherein the third codeword length is longer than the second codeword length, which is longer than the first codeword length. The method also may comprise decoding, with the receiving UWB device, the payload using the selected codeword length.

An example transmitting ultra-wideband (UWB) device, according to this disclosure, may comprise a transceiver, a memory, one or more processors communicatively coupled with the transceiver and the memory, wherein the one or more processors are configured to determine a number of information bits of a payload to communicate via UWB. The one or more processors further may be configured to select, based on the number of information bits, a codeword length from a selection of available codeword lengths with which to encode the payload using a low-density parity-check (LDPC) encoding scheme, wherein the selection of available codeword lengths include a first codeword length, a second codeword length, and a third codeword length, wherein the third codeword length is longer than the second codeword length, which is longer than the first codeword length. The one or more processors further may be configured to transmit, via the transceiver, the payload using one or more codewords having the selected codeword length.

An example receiving ultra-wideband (UWB) device comprising: a transceiver, a memory, one or more processors communicatively coupled with the transceiver and the memory, wherein the one or more processors are configured to receive, via the transceiver, a payload having one or more codewords transmitted via UWB communication by a transmitting UWB device, the payload having a number of information bits. The one or more processors further may be configured to select, based on the number of information bits, a codeword length from a selection of available codeword lengths with which to decode the payload using a low-density parity-check (LDPC) decoding scheme, wherein the selection of available codeword lengths include a first codeword length, a second codeword length, and a third codeword length, wherein the third codeword length is longer than the second codeword length, which is longer than the first codeword length. The one or more processors further may be configured to decode the payload using the selected codeword length.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 2 is a diagram of tables showing different physical layer (PHY) headers that can be utilized in accordance with different ultra-wideband (UWB) modes.

FIG. 3 is a table showing codeword length selection in accordance with a first codeword length selection option.

FIG. 4 is a table showing codeword length selection in accordance with a second codeword length selection option.

FIG. 5 is a table showing codeword length selection in accordance with a third codeword length selection option.

Figure 1A:
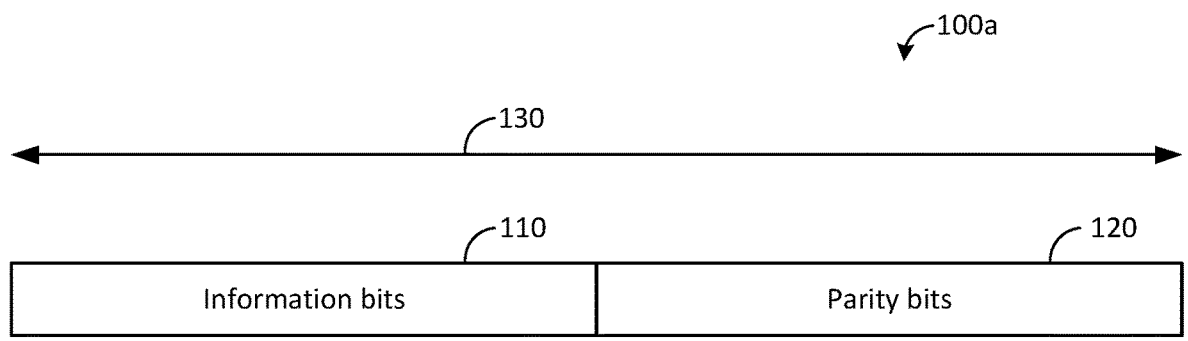
FIGS. 1A and 1B are graphs illustrating the basic features of codewords.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc., or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any ultra-wideband (UWB) standard, such as any of the Institute of Electrical and Electronics Engineers (IEEE) 802.15.4 standards for UWB. That said, embodiments may apply to and/or incorporate other wireless standards such as IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

UWB is a wireless technology that has been utilized to perform high-accuracy positioning, especially indoors. However, UWB has become an increasingly attractive option for data communication in close-range, high-data-rate applications, due to its relatively high bandwidth. Because data communication has not been a traditional focus of UWB, there are opportunities to further develop UWB's data communication capabilities. In particular, existing and future applications for UWB data communication may require higher data rates than currently provided with UWB data communication. And thus new, more sophisticated coding design may be used to enable these higher data rates.

Low-density parity-check (LDPC) encoding is an aspect of coding design that may be implemented in future releases of UWB communication. In particular, LDPC is a primary candidate for advanced optional coding in next-generation UWB standard amendment in the IEEE 802.15.4ab standard. The consideration of LDPC is due to the ability of LDPC coding to improve throughput and (potentially) link budget for UWB data communication, relative to convolutional coding in previous generations.

Depending on desired functionality, different variants of LDPC may be used in UWB. The current LDPC variant under consideration may be similar to 802.11n LDPC codes, with a nominal coding rate of ½, where three codeword lengths are under consideration: 648, 1296, 1944.

FIG. 1A is a graph illustrating the basic features of a codeword 100a. As illustrated, the codeword 100a comprises information bits 110 and parity bits 120. A nominal coding rate of ½, the number of information bits 110 is equal to the number of parity bits 120. Thus, if the total codeword length 130 is 648 bits long, the number of information bits 110 would be a maximum of 324.

Figure 1B:
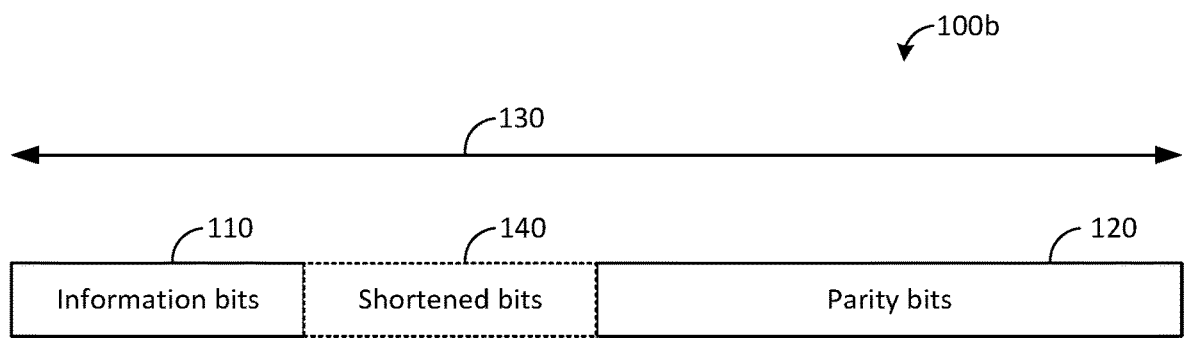

FIG. 1B illustrates an example codeword 100b of what can be done when number of information bits is not equal to half the codeword length (e.g., 324, 648, or 972). Here, information bits our zero-padded to keep the full parity bits for the rate ½ codes. These zero-padded bits (shortened bits 140) are removed before transmission.

Various aspects of the embodiments herein generally to the selection of LDPC codeword lengths and distribution of shortening bits across multiple codewords. Some aspects more specifically relate to determining the number of information bits of a payload to communicate, selecting a codeword length (e.g., from a predetermined selection of available codeword lengths) with which to encode the payload using an LDPC encoding scheme, and transmitting the payload using one or more codewords having the selected codeword length. A codeword length selection scheme, detailed herein, may be used to help optimize efficient communications. A physical (PHY) layer header may indicate the number of information bits. In some examples, predetermined codeword lengths of 648 bits, 1296 bits, or 1944 bits may be used (or any combination thereof).

Particular aspects of the subject matter described in this disclosure can be implemented to realize one or more of the following potential advantages. In some examples, by implementing codeword selection as described herein, the described techniques can be used to improve UWB communications by reducing overhead and/or providing robust transmissions in LDPC encoding. These and other advantages will be apparent to a person of ordinary skill in the art in view of the embodiments provided below.

FIG. 2 is a diagram of tables showing different physical layer (PHY) headers that can be utilized in accordance with base pulse repetition frequency (BPRF) and higher pulse repetition frequency (HPRF) modes in relevant UWB standards (e.g., the IEEE 802.15.4 standard amendment). PHY headers can indicate PHY information in a data packet communicated via UWB.

As illustrated, different modes have differently designed PHY headers to communicate PHY information in different ways. The BPRF (legacy) PHY header 210, for example, has bits designated for data rate, frame length, ranging, preamble duration, and single error correction and double error detection (SECDED). The HPRF PHY header 220 has a different arrangement of bits designated for functionality bits (A1 and A0), PHY payload length, ranging, and SECDED.

Embodiments here can accommodate lengths in PHY headers 210 and 220 that may be represented in different ways. In particular, according to some embodiments, the frame length of BPRF PHY header 210 and PHY payload length of HPRF PHY header 220 may represent one of the following:

Option 1: the number of information bytes from a medium access control (MAC) layer (e.g. corresponding to information bits 110 of FIGS. 1A and 1B), or Option 2: an entire physical layer convergence protocol (PLCP) protocol data unit (PPDU) length from a PHY layer, in the units of number of pulses (or chips) in unit of octets.

These two options are referred to herein as packet header (PHR) indication options (which again may be utilized in BPRF and/or HPRF modes). With respect to PHR indication Option 1, codeword lengths can be derived from the number of information bits corresponding to information bytes in the PHY header. With respect to PHR indication Option 2, the number of information bits and parity bits may be derived from the overall PPDU length.

Embodiments herein can provide for codeword length selection based on a number of information bits. According to some embodiments, codeword length may be uniform for the coding of a given payload (e.g., two different codeword lengths are not combined). With these constraints, a codeword length may be selected to minimize the overhead due to unnecessary parity checks.

According to some embodiments, codeword selection in an LDPC encoding scheme having three optional codeword lengths of 648, 1296, and 1944 bits may proceed in accordance with one or more of the following three options:

Option 1: Use a single codeword having a length of 1296 bits,

Option 2: Use a maximum of two codewords having a length of 1296 bits, or

Option 3: Minimizing overhead by using codewords having a length of 1296 bits or 1944 bits.

These three options are referred to herein as codeword length selection options. In LDPC encoding scheme utilize one or more of these options based on desired functionality, which may be governed by an applicable UWB standard. Generally put, the options with more constraints can provide more savings in overhead, but can also be more complex to implement. Thus, with respect to the codeword length selection options, Option 2 may be more complex to implement than Option 1, and Option 3 may be more complex to implement than Option 2. Thus, the option(s) to implement may be selected based on a preferred balance of savings in overhead and complexity. Examples of each option are described in more detail hereafter.

It can be noted that, although embodiments described herein are described with respect to particular codeword lengths, alternative embodiments may utilize additional and/or alternative lengths. Put differently, embodiments described herein having codeword lengths of 648, 1296, and 1944 bits may be extended to any embodiment having three different codeword lengths (e.g., where short, medium, and long codeword lengths correspond with codeword lengths of 640, 1296, and 1944 bits, respectively, as described in the embodiments herein).

FIG. 3 is a table 300 showing codeword length selection in accordance with codeword length selection Option 1 (using a single codeword having a length of 1296 bits). Here, the number of information bits, $N_{pld}$, may be determined from the PHY header (e.g., directly if PHR indication Option 1 is used).

As indicated in the table 300, according to codeword length selection Option 1:

If $1 \leq N_{pld} \leq 324$ bits (or $1 \leq N_{pld} \leq 40$ octets), then a single LDPC codeword having a codeword length, $L_{LDPC}$, of 648 bits would be used. The corresponding coded length, $N_{Coded}$, would be the number of parity bits for the 648-bit codeword (324 bits) plus $N_{pld}$: $325 \leq N_{coded} \leq 648$ bits.

If $325 \leq N_{pld} \leq 648$ bits (or $41 \leq N_{pld} \leq 81$ octets), then a single LDPC codeword having a codeword length of 1296 bits would be used. The corresponding $N_{coded}$ would be the number of parity bits for the 1296-bit codeword (648 bits) plus $N_{pld}$: $973 \leq N_{coded} \leq 1296$ bits.

If $N_{pld} \geq 649$ bits (or $N_{pld} \geq 82$ octets), then as many 1944-bit LDPC codewords as needed would be used. The corresponding $N_{Coded}$ would be the number of parity bits for the 1944-bit codeword (972 bits) plus $N_{pld}$: $1621 \leq N_{coded}$ bits.

FIG. 4 is a table 400 showing codeword length selection in accordance with codeword length selection Option 2 (a maximum of two codewords having a length of 1296 bits). As indicated in the table 400, aspects are similar to the table 300 of FIG. 3, with some differences—primarily the use of two 1296-bit codewords.

According to codeword length selection Option 2:

If] $1 \leq N_{pld}$ d 324 bits (or $1 \leq N_{pld} \leq 40$ octets), then a single LDPC codeword having a codeword length, $L_{LDPC}$, of 648 bits would be used. The corresponding coded length, $N_{Coded}$, would be the number of parity bits for the 648-bit codeword (324 bits) plus $N_{pld}$: $325 \leq N_{coded} \leq 648$ bits.

If $325 \leq N_{pld} \leq 648$ bits (or $41 \leq N_{pld} \leq 81$ octets), then a single LDPC codeword having a codeword length of 1296 bits would be used. The corresponding $N_{Coded}$ would be the number of parity bits for the 1296-bit codeword (648 bits) plus $N_{pld}$: $973 \leq N_{coded}$ 1296 bits.

If $649 \leq N_{pld} \leq 972$ bits (or $82 \leq N_{pld}$ 121 octets), then a single LDPC codeword having a codeword length of 1944 bits would be used. The corresponding $N_{Coded}$ would be the number of parity bits for the 1944-bit codeword (972 bits) plus $N_{pld}$: $1621 \leq N_{coded} \leq 1944$ bits.

If $973 \leq N_{pld} \leq 1296$ bits (or $122 \leq N_{pld} \leq 162$ octets), then two LDPC codewords each having a codeword length of 1296 bits would be used. The corresponding $N_{coded}$ would be the number of parity bits for the two 1296-bit codewords (1296 bits) plus $N_{pld}$: $2269 \leq N_{coded} \leq 2592$ bits.

If $N_{pld} \geq 1297$ bits (or $N_{pld} \geq 163$ octets) then as many 1944-bit LDPC codewords as needed would be used. The corresponding $N_{Coded}$ would be the number of parity bits for the two or more 1944-bit codeword (1944 bits or more) plus $N_{pld}$: $3241 \leq N_{coded}$ bits.

Here, the addition of an available selection having two 1296-bit codewords can help reduce overhead compared with codeword length selection Option 1. In particular, $973 \leq N_{pld} \leq 1296$ bits, codeword length selection Option 2 has a higher effective code rate than codeword length selection Option 1: the effective code rate for Option 2 is $N_{pld}/2592$ and for Option 1 is $N_{pld}/3888$.

In some aspects, codeword length selection Option 2 may be considered similar to the codeword length selection scheme of 802.11be. However, in 802.11be, the codeword length is specified, so reverse mapping is needed to determine number of information bits. In the case of codeword length selection Option 2 for UWB, the number information bits may be specified in PHR, as previously noted, so it may not require reverse mapping.

FIG. 5 is a table 500 showing codeword length selection in accordance with codeword length selection Option 3 (minimizing overhead by using codewords having a length of 1296 bits or 1944 bits). As indicated in the table 500, aspects are similar to the table 400 of FIG. 4, with a difference in codeword length for $1297 \leq N_{pld}$.

According to codeword length selection Option 3:

If] $1 \leq N_{pld}$ d 324 bits (or $1 \leq N_{pld} \leq 40$ octets), then a single LDPC codeword having a codeword length, $L_{LDPC}$, of 648 bits would be used. The corresponding coded length, $N_{Coded}$, would be the number of parity bits for the 648-bit codeword (324 bits) plus $N_{pld}$: $325 \leq N_{coded} \leq 648$ bits.

If $325 \leq N_{pld} \leq 648$ bits (or $41 \leq N_{pld} \leq 81$ octets), then a single LDPC codeword having a codeword length of 1296 bits would be used. The corresponding $N_{Coded}$ would be the number of parity bits for the 1296-bit codeword (648 bits) plus $N_{pld}$: $973 \leq N_{coded}$ 1296 bits.

If $649 \leq N_{pld} \leq 972$ bits (or $82 \leq N_{pld}$ 121 octets), then a single LDPC codeword having a codeword length of 1944 bits would be used. The corresponding $N_{Coded}$ would be the number of parity bits for the 1944-bit codeword (972 bits) plus $N_{pld}$: $1621 \leq N_{coded} \leq 1944$ bits.

If $973 \leq N_{pld} \leq 1296$ bits (or $122 \leq N_{pld} \leq 162$ octets) then two LDPC codewords each having a codeword length of 1296 bits would be used. The corresponding $N_{Coded}$ would be the number of parity bits for the two 1296-bit codewords (1296 bits) plus $N_{pld}$: $2269 \leq N_{coded} \leq 2592$ bits.

If $N_{pld} \geq 1297$ bits (or $N_{pld} \geq 163$ octets), then as many 1296-bit or 1944-bit LDPC codewords as needed would be used. The decision on whether to use 1296-bit codewords or 1944-bit codewords is made based on which option has smaller number of parity bits. (See inequality in the last row of the table 500 of FIG. 5.) The corresponding $N_{Coded}$ would be the number of parity bits for the three or more 1296-bit codeword (1944 bits or more) plus $N_{pld}$: $3241 \leq N_{coded}$ bits.

In accordance with this option, the overhead can be reduced (e.g., compared with codeword length selection Options 1 and 2) through selection of a codeword length with a smaller total number of parity bits.

Figure 6:
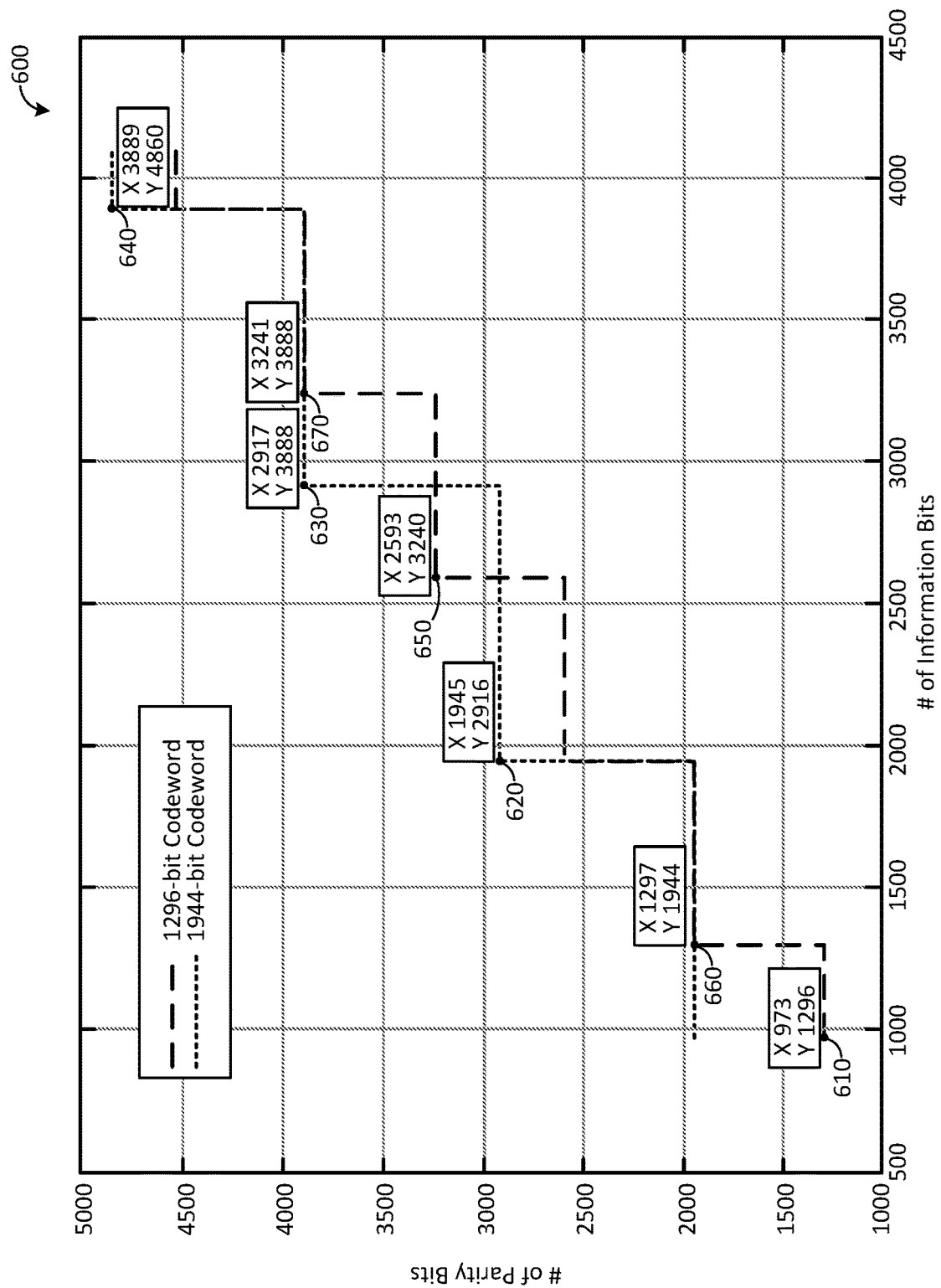
FIG. 6 is a graph that plots the number of parity bits over the number of information bits for 1296-bit codewords and 1944-bit codewords for the second codeword length selection option.

FIG. 6 is a graph 600 that plots the number of parity bits (Y axis) over the number of information bits (X axis) for 1296-bit codewords and 1944-bit codewords. This provides a comparison of the overhead between the use of 1296-bit codewords and 1944-bit codewords for the transmission of information bits ranging from 973 to 4096 information bits, further showing how the different codeword length selection options discussed above compare, with respect to overhead.

As can be seen, using 1296-bit codewords has less overhead than 1944-bit codewords at information bit numbers, and vice versa. For example, at points 610, 620, 630, and 640, where the number of information bits are 973, 1945, 2917, and 3889 respectively, using 1296-bit codewords has less overhead than using 1944-bit codewords. On the other hand, at point 650, where the number of information bits is 2593, using 1944-bit codewords has less overhead than using 1296-bit codewords. At points 660 and 670, the use of 1296-bit codewords and 1944-bit codewords has the same overhead.

In view of the graph 600, the use of codeword length selection Option 1 generally has more overhead than the use of codeword length selection Option 2, which generally has more overhead than the use of codeword length selection Option 3. That is, Option 1 uses 1944-bit length codewords for 649 information bits or more. As shown at point 610, this has more overhead than the use of 1296-bit codewords. Option 2 uses 1296-bit codewords for 973-1296 information bits, thereby resulting in less overhead at point 610. However, Option 2 switches to the use of 1944-bit codewords for information bits exceeding 1297. Thus, Option 2 has more overhead than Option 3 at points 620, 630, and 640.

Embodiments herein further provide options with respect to the distribution of shortened bits (e.g., shortened bits 140 in FIG. 1B) across codewords. That is, in cases where the number of information bits does not equal a multiple of the total number of information bits a codeword can include, shortened bits will be used. In such instances, where multiple codewords are used to transmit the information bits, shortened bits may be used in accordance with one or more of the following two options:

Option 1: evenly distribute the shortened bits among the codewords, or

Option 2: allocate all the shortened bits in one codeword.

These two options are referred to herein as shortened bit distribution options. Shortened bit distribution Option 1 (even distribution among the codewords) can lead leads to equal protection of information bits in all codewords against error. For example, in embodiments in which codeword length selection Options 1 and 2 are used, a payload having 2624 information bits will use three 1944-bit codewords. This will result in 292 shortened bits (0.333 shortened bits/codeword). This may be distributed by allocating 98 shortened bits to the first codeword, and 97 shortened bits to the remaining two.

Shortened bit distribution Option 2 may be easier to implement. All shortened bits may be allocated to the first or last codeword, for example.

According to some embodiments, the options provided herein for PHR indication, shortened bit distribution, codeword length selection, or any combination, may be described and/or implemented using one or more formulas. This can be used by a receiving UWB device, for example, to determine how to partition bits for decoding.

For example, for PHR indication Option 1 and shortened bit distribution Option 1, the following operations may be performed to provide a coded length, codewords being used, and number of shortened bits for each codeword:

For $N_{pld}$ information bits, the LDPC codeword length ($L_{LDPC}$) may be determined from tables 300, 400, or 500 of FIGS. 3-5, depending on which codeword length selection option is used.

The number of codewords may be determined as $$N_{LDPC} = \left\lceil \frac{2 * N_{pld}}{L_{LDPC}} \right\rceil,$$

where $\lceil \cdot \rceil$ represents the ceiling operation.

The total length of coded bits may be determined as $$L_{Coded} = N_{LDPC} * \frac{L_{LDPC}}{2} + N_{pld}.$$

The total number of shortening bits may be determined as $$N_{Shortening} = N_{LDPC} * \frac{L_{LDPC}}{2} - N_{pld}.$$

Let $r$ = remainder $\left(\frac{N_{Shortening}}{N_{LDPC}}\right)$ and $Q$ = Quotient $\left(\frac{N_{Shortening}}{N_{LDPC}}\right)$, then the $i^{th}$ codeword lengths ($N_{Coded}^{(i)}$) is as:

$$N_{Coded}^{(i)} = \begin{cases} L_{LDPC} - (Q+1) & i \le r \\ L_{LDPC} - Q & i > r \end{cases}.$$

As another example, for PHR indication Option 1 and shortened bit distribution Option 2, the following operations may be performed to provide a coded length, codewords being used, and number of shortened bits for each codeword:

For $N_{pld}$ information bits, the LDPC codeword length ($L_{LDPC}$) is determined from table 300, 400, or 500 of FIGS. 3-5, depending on which codeword length selection option is used.

The number of codewords are determined as $$N_{LDPC} = \left\lceil \frac{2 * N_{pld}}{L_{LDPC}} \right\rceil,$$

where $\lceil \cdot \rceil$ represents the ceiling operation.
The total length of coded bits is determined as $L_{Coded} = N_{LDPC} * L_{LDPC}/2 + N_{pld}$.
The total number of shortening bits is determined as $$N_{Shortening} = N_{LDPC} * \frac{L_{LDPC}}{2} - N_{pld}.$$

The $i^{th}$ codeword lengths ($N_{Coded}^{(i)}$) is as follows:

$$N_{Coded}^{(i)} = \begin{cases} L_{LDPC} - N_{Shortening} & i = 1 \text{ (or } i = N_{LDPC}) \\ L_{LDPC} & \text{else} \end{cases}.$$

According to some embodiments, embodiments may employ a different set of operations to accommodate PHR indication Option 2. PHR indication Option 2 may be utilized with any of the codeword length selection options and/or shortened bit distribution options described herein. With this in mind, the following steps can be used for reverse mapping the coded length to determine payload side bit processing:

For a given $L_{Coded}$ coded length in PHR, the LDPC codeword length ($L_{LDPC}$) is determined from table 300, 400, or 500 of FIGS. 3-5, depending on which codeword length selection option is used.

The number of codewords may be determined as $$N_{LDPC} = \left\lceil \frac{L_{Coded}}{L_{LDPC}} \right\rceil,$$

where $\lceil \cdot \rceil$ represents the ceiling operation.

The total length of parity bits may be determined as $$L_{Parity} = N_{LDPC} * \frac{L_{LDPC}}{2}.$$

The total number of information bits ($N_{pld}$) may be determined as $N_{pld} = L_{Coded} - L_{Parity}$.
The total number of shortening bits may be determined as $$N_{Shortening} = N_{LDPC} * \frac{L_{LDPC}}{2} - N_{pld}.$$

For shortened bit distribution Option 1, let $$r = \text{remainder} \left(\frac{N_{Shortening}}{N_{LDPC}}\right) \text{ and } Q = \text{Quotient} \left(\frac{N_{Shortening}}{N_{LDPC}}\right),$$

then the $i^{th}$ codeword lengths ($N_{Coded}^{(i)}$) may be as follows $$N_{Coded}^{(i)} = \begin{cases} L_{LDPC} - (Q+1) & i \le r \\ L_{LDPC} - Q & i > r \end{cases}.$$

Alternatively, for shortened bit distribution Option 2, the $i^{th}$ codeword lengths ($N_{Coded}^{(i)}$) may be as follows:

$$N_{Coded}^{(i)} = \begin{cases} L_{LDPC} - N_{Shortening} & i = 1 \text{ (or } i = N_{LDPC}) \\ L_{LDPC} & \text{else} \end{cases}.$$

Figure 7:
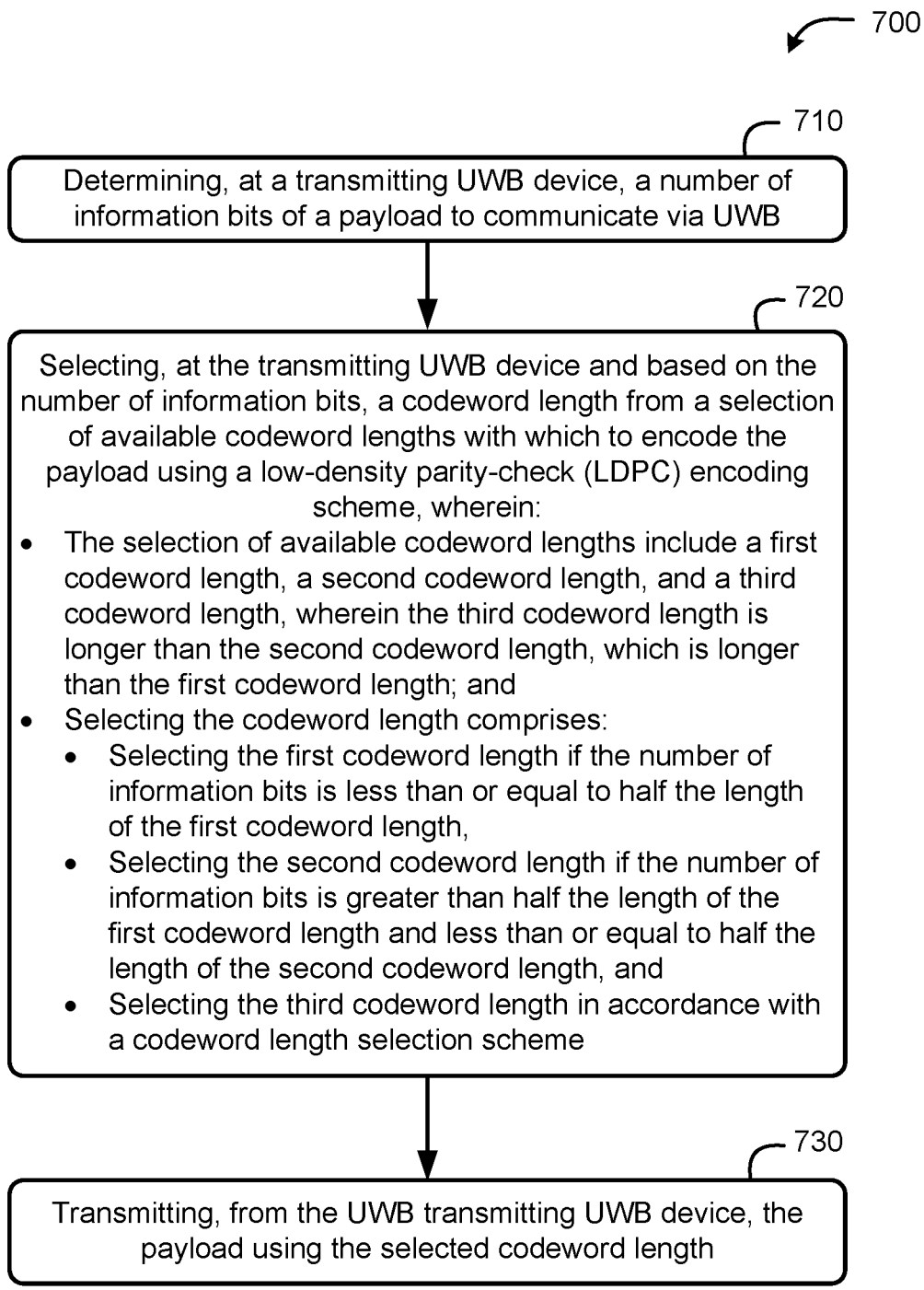
FIG. 7 is a flow diagram of a method of UWB communication, according to an embodiment.

FIG. 7 is a flow diagram of a method 700 of UWB communication, according to an embodiment. In particular, the method 700 comprises a method that may be performed by a transmitting UWB device for selecting a codeword length when encoding a payload for UWB transmission. As such, aspects of the method 700 may correspond with embodiments described herein in which codeword length selection is made. Means for performing the functionality illustrated in one or more of the blocks shown in FIG. 7 may be performed by hardware and/or software components of a UWB device. Example components of a UWB device are illustrated in FIG. 9, which is described in more detail below.

At block 710, the functionality comprises determining, at a transmitting UWB device, a number of information bits of a payload to communicate via UWB. This determination may be made, for example, at a PHY layer of a UWB transceiver. Moreover, the determination may be made based on the length of a UWB transmission to be sent via the UWB transmitter. Current standards limit UWB transmissions to 4096 bytes, although alternative embodiments may be capable of transmitting a larger number of bytes. (Other embodiments may have a lower maximum limit for UWB transmissions.)

Figure 9:
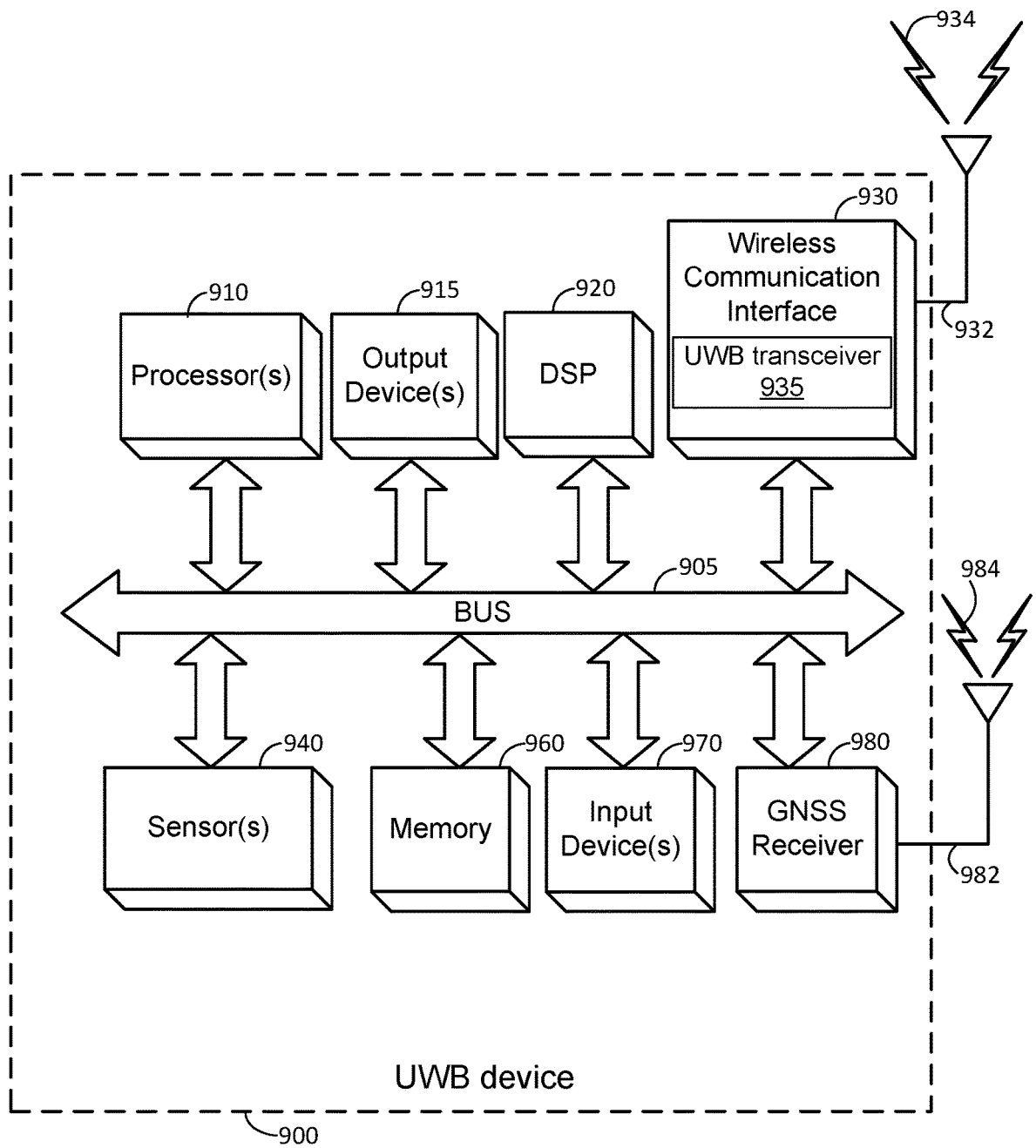
FIG. 9 is a block diagram of an embodiment of a UWB device.

Means for performing functionality at block 710 may comprise a bus 905, processors 910, DSP 920, wireless communication interface 930 (including UWB transceiver 935), memory 960, and/or other components of a UWB device 900, as illustrated in FIG. 9.

At block 720, the functionality comprises selecting, at the transmitting UWB device and based on the number of information bits, a codeword length from a selection of available codeword lengths with which to encode the payload using an LDPC encoding scheme, wherein: the selection of available codeword lengths include a first codeword length, a second codeword length, and a third codeword length, wherein the third codeword length is longer than the second codeword length, which is longer than the first codeword length; and selecting the codeword length comprises (i) selecting the first codeword length if the number of information bits is less than or equal to half the length of the first codeword length, (ii) selecting the second codeword length if the number of information bits is greater than half the length of the first codeword length and less than or equal to half the length of the second codeword length, and (iii) selecting the third codeword length in accordance with a codeword length selection scheme. As noted, in some implementations, the first codeword length may be 648 bits, the second codeword length may be 1296 bits, and the third codeword length may be 1944 bits. That said, other embodiments may use different codeword lengths.

As described herein with respect to FIGS. 3-5, codeword length selection may vary in cases where the number of information bits exceeds the information bit capacity for a single codeword of the longest length (e.g., the third codeword length). As such, embodiments may vary, depending on the type of codeword length selection scheme implemented, which may depend on desired functionality, a governing specification (e.g., 802.15.4), or the like. According to some embodiments of the method 700, in accordance with the codeword length selection scheme, the third codeword length may be selected if the number of information bits is greater than half the length of the second codeword length (e.g., as described with respect to table 300 of FIG. 3). According to some embodiments of the method 700, in accordance with the codeword length selection scheme: (i) the third codeword length may be selected if the number of information bits is greater than half the length of the second codeword length and less than or equal to half the length of the third codeword length; (ii) the second codeword length may be further selected if the number of information bits is greater than half the length of the third codeword length and less than or equal to the length of the second codeword length; and (iii) the third codeword length may be selected if the number of information bits is greater than the length of the second codeword length (e.g., as described with respect to table 400 of FIG. 4). According to some embodiments of the method 700, in accordance with the codeword length selection scheme: (i) the third codeword length may be selected if the number of information bits is greater than half the length of the second codeword length and less than or equal to half the length of the third codeword length; and (ii) the second codeword length may be further selected if the number of information bits is greater than half the length of the third codeword length.

As further described herein, embodiments may use different options for PHR indication, which may depend on the PHR indication mode implemented in the UWB communication. (Again, this may be governed by applicable standard.) According to some embodiments of the method 700, the number of information bits comprises a frame length or payload length, indicated in a PHR wherein the frame length or payload length represents: (i) a number of information bytes from a MAC layer, or (ii) an entire PPDU length from a PHY layer.

Means for performing functionality at block 720 may comprise a bus 905, processors 910, DSP 920, wireless communication interface 930 (including UWB transceiver 935), memory 960, and/or other components of a UWB device 900, as illustrated in FIG. 9.

At block 730, the functionality comprises transmitting, from the UWB transmitting device, the payload using the selected codeword length. As noted in various embodiments described herein, shortened bits may be distributed in different ways, depending on desired functionality. As such, according to some embodiments of the method 700, transmitting the payload using the selected codeword length may comprise encoding the payload using a plurality of codewords having the selected codeword length such that: (i) shortened bits are evenly distributed among the codewords of the plurality of codewords, or (ii) shortened bits are all included in the first codeword or the last codeword of the plurality of codewords.

Means for performing functionality at block 730 may comprise a bus 905, processors 910, DSP 920, wireless communication interface 930 (including UWB transceiver 935), memory 960, and/or other components of a UWB device 900, as illustrated in FIG. 9.

Figure 8:
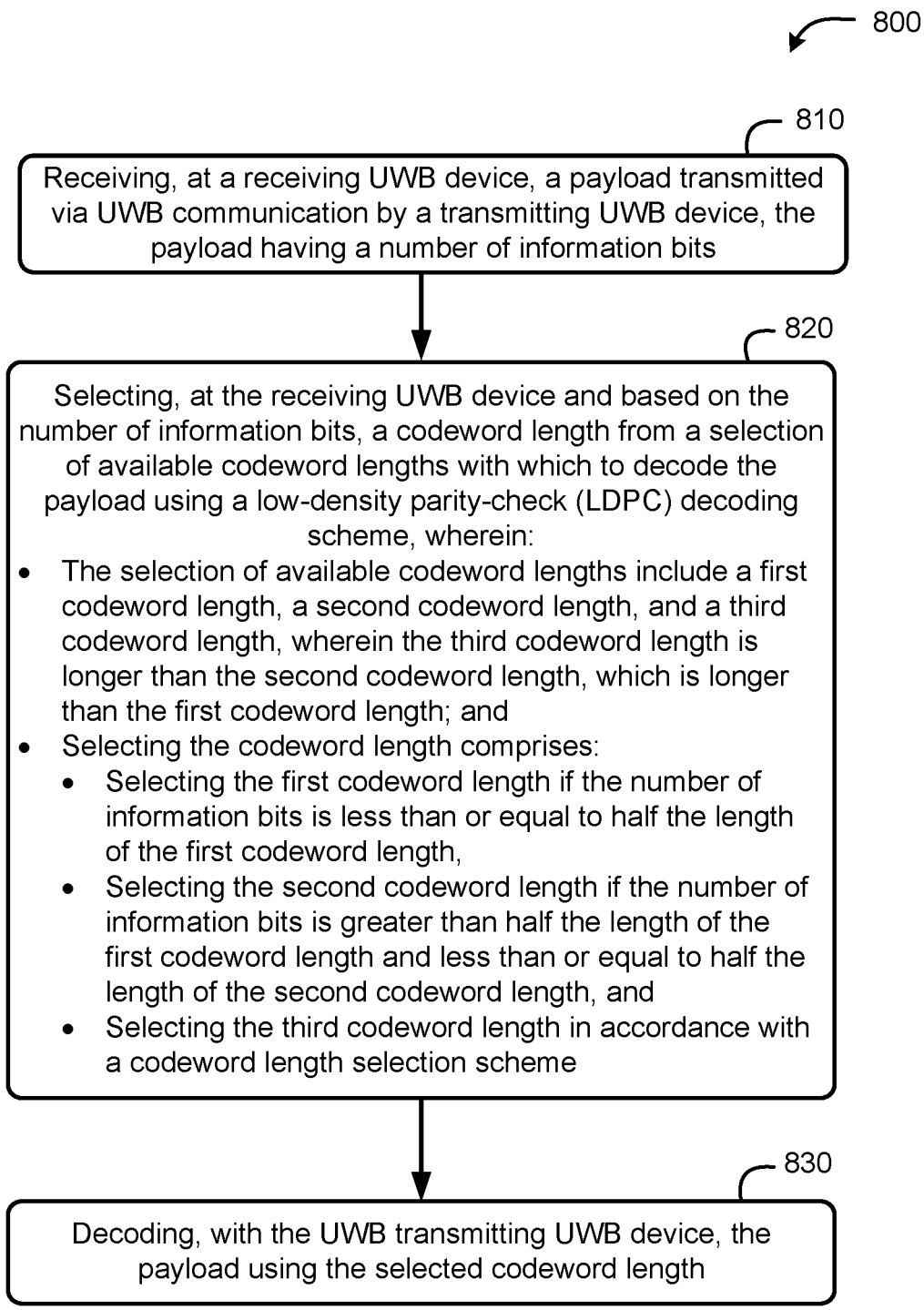
FIG. 8 is a flow diagram of another method of UWB communication, according to an embodiment.

FIG. 8 is a flow diagram of a method 800 of UWB communication, according to an embodiment. In particular, the method 800 comprises a method that may be performed by a receiving UWB device for selecting a codeword length when decoding a payload received via UWB transmission. As such, aspects of the method 800 may correspond with embodiments described herein in which codeword length selection is made. The method 800 may be performed by a receiving UWB device that receives a UWB transmission sent by a transmitting UW device performing the method 700 of FIG. 7. Means for performing the functionality illustrated in one or more of the blocks shown in FIG. 8 may be performed by hardware and/or software components of a UWB device. Example components of a UWB device are illustrated in FIG. 9, which is described in more detail below.

At block 810, the functionality comprises receiving, at a receiving UWB device, stream of coded data transmitted via UWB communication by a transmitting UWB device, the payload having a number of information bits. Again, current standards limit UWB transmissions to 4096 bytes, although alternative embodiments may be capable of transmitting a larger number of bytes. (Other embodiments may have a lower maximum limit for UWB payloads.) Means for performing functionality at block 810 may comprise a bus 905, processors 910, DSP 920, wireless communication interface 930 (including UWB transceiver 935), memory 960, and/or other components of a UWB device 900, as illustrated in FIG. 9.

At block 820, the functionality comprises selecting, at the receiving UWB device and based on the number of information bits, a codeword length from a selection of available codeword lengths with which to decode the payload using an LDPC decoding scheme, wherein: the selection of available codeword lengths include a first codeword length, a second codeword length, and a third codeword length, wherein the third codeword length is longer than the second codeword length, which is longer than the first codeword length; and selecting the codeword length comprises (i) selecting the first codeword length if the number of information bits is less than or equal to half the length of the first codeword length, (ii) selecting the second codeword length if the number of information bits is greater than half the length of the first codeword length and less than or equal to half the length of the second codeword length, and (iii) selecting the third codeword length in accordance with a codeword length selection scheme. As noted, in some implementations, the first codeword length may be 648 bits, the second codeword length may be 1296 bits, and the third codeword length may be 1944 bits. That said, other embodiments may use different codeword lengths.

Again, as described herein with respect to FIGS. 3-5, codeword length selection may vary in cases where the number of information bits exceeds the information bit capacity for a single codeword of the longest length (e.g., the third codeword length). As such, embodiments may vary, depending on the type of codeword length selection scheme implemented, which may depend on desired functionality, a governing specification (e.g., 802.15.4), or the like. According to some embodiments of the method 800, in accordance with the codeword length selection scheme, the third codeword length may be selected if the number of information bits is greater than half the length of the second codeword length (e.g., as described with respect to table 300 of FIG. 3). According to some embodiments of the method 800, in accordance with the codeword length selection scheme: (i) the third codeword length may be selected if the number of information bits is greater than half the length of the second codeword length and less than or equal to half the length of the third codeword length; (ii) the second codeword length may be further selected if the number of information bits is greater than half the length of the third codeword length and less than or equal to the length of the second codeword length; and (iii) the third codeword length may be selected if the number of information bits is greater than the length of the second codeword length (e.g., as described with respect to table 400 of FIG. 4). According to some embodiments of the method 800, in accordance with the codeword length selection scheme: (i) the third codeword length may be selected if the number of information bits is greater than half the length of the second codeword length and less than or equal to half the length of the third codeword length; and (ii) the second codeword length may be further selected if the number of information bits is greater than half the length of the third codeword length.

As further described herein, embodiments may use different options for PHR indication, which may depend on the PHR indication mode implemented in the UWB communication. (Again, this may be governed by applicable standard.) According to some embodiments of the method 800, the number of information bits comprises a frame length or payload length, indicated in a PHR wherein the frame length or payload length represents: (i) a number of information bytes from a MAC layer, or (ii) an entire PPDU length from a PHY layer.

Means for performing functionality at block 820 may comprise a bus 905, processors 910, DSP 920, wireless communication interface 930 (including UWB transceiver 935), memory 960, and/or other components of a UWB device 900, as illustrated in FIG. 9.

At block 830, the functionality comprises decoding, with the receiving UWB device, the payload using the selected codeword length. As noted in various embodiments described herein, shortened bits may be distributed in different ways, depending on desired functionality. As such, according to some embodiments of the method 800, decoding the payload using the selected codeword length may comprise encoding the payload using a plurality of codewords having the selected codeword length such that: (i) shortened bits are evenly distributed among the codewords of the plurality of codewords, or (ii) shortened bits are all included in the first codeword or the last codeword of the plurality of codewords.

Means for performing functionality at block 830 may comprise a bus 905, processors 910, DSP 920, wireless communication interface 930 (including UWB transceiver 935), memory 960, and/or other components of a UWB device 900, as illustrated in FIG. 9.

FIG. 9 is a block diagram of an embodiment of a UWB device 900, which can be utilized as described herein, e.g., as a transmitting UWB device and/or receiving UWB device. It should be noted that FIG. 9 is meant only to provide a generalized illustration of various components, any or all of which may be utilized as appropriate. For example, more basic/simple types of UWB devices (e.g., UWB tags that can be placed on items for tracking, UWB beacons used primarily or exclusively for positioning, etc.) may omit various components that may be included in more advanced/complex UWB devices. More advanced or capable UWB devices may comprise a mobile phone, tablet or other portable computing device, etc. Further, some UWB devices may be mobile (e.g., portable), and others may be stationary, and components of the UWB device may vary based on whether the UW device is mobile or stationary. Furthermore, as previously noted, the functionality in the previously described embodiments may be executed by one or more of the hardware and/or software components illustrated in FIG. 9.

The UWB device 900 is shown comprising hardware elements that can be electrically coupled via a bus 905 (or may otherwise be in communication, as appropriate). The hardware elements may include processor(s) 910 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 910 may comprise one or more processing units, which may be housed in a single integrated circuit (IC) or multiple ICs. As shown in FIG. 9, some embodiments may have a separate DSP 920, depending on desired functionality. Location determination and/or other determinations based on wireless communication may be provided in the processor(s) 910 and/or wireless communication interface 930 (discussed below). The UWB device 900 also can include one or more input devices 970, which can include without limitation one or more keyboards, touch screens, touch pads, microphones, buttons, dials, switches, and/or the like; and one or more output devices 915, which can include without limitation one or more displays (e.g., touch screens), light emitting diodes (LEDs), speakers, and/or the like.

The UWB device 900 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UWB device 900 to communicate with other devices as described herein. The wireless communication interface 930 may permit data and signaling to be communicated (e.g., transmitted and received) with access points, various base stations and/or other access node types, and/or other network components, computer systems, and/or any other electronic devices communicatively coupled therewith. The communication can be carried out via one or more wireless communication antenna(s) 932 that send and/or receive wireless signals 934. According to some embodiments, the wireless communication antenna(s) 932 may comprise a plurality of discrete antennas, antenna arrays, or any combination thereof. The antenna(s) 932 may be capable of transmitting and receiving wireless signals using beams (e.g., Tx beams and Rx beams). Beam formation may be performed using digital and/or analog beam formation techniques, with respective digital and/or analog circuitry. The wireless communication interface 930 may include such circuitry.

As illustrated, the wireless indication interface 930 may further comprise a UWB transceiver 935. The UWB transceiver 935 may be operated to perform the UWB operations described herein. Further, the wireless communications interface 930 may comprise one or more additional communication technologies with which any OOB (non-UWB) functionalities may be performed. According to some embodiments, the UWB transceiver 935 may be one of a plurality of UWB transceivers of the UWB device 900. Further, the UWB transceiver may be used for functionality in addition to the UWB positioning functionality described herein. Although illustrated as part of the wireless communication interface 930, the UWB transceiver 935 may be separate from the wireless communication interface 930 in some embodiments.

Depending on desired functionality, the wireless communication interface 930 may comprise a separate receiver and transmitter, or any combination of transceivers, transmitters, and/or receivers to communicate with base stations (e.g., ng-eNBs and gNBs) and other terrestrial transceivers, such as wireless devices and access points. The UWB device 900 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UWB device 900 can further include sensor(s) 940. Sensor(s) 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UWB device 900 may also include a Global Navigation Satellite System (GNSS) receiver 980 capable of receiving signals 984 from one or more GNSS satellites using an antenna 982 (which could be the same as antenna 932). Positioning based on GNSS signal measurement can be utilized to complement and/or incorporate the techniques described herein. The GNSS receiver 980 can extract a position of the UWB device 900, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS), and/or the like. Moreover, the GNSS receiver 980 can be used with various+storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the UWB device 900 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the UWB device 900 (and/or processor(s) 910 or DSP 920 within UWB device 900). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of ultra-wideband (UWB) communication, the method comprising: determining, at a transmitting UWB device, a number of information bits of a payload to communicate via UWB; selecting, at the transmitting UWB device and based on the number of information bits, a codeword length from a selection of available codeword lengths with which to encode the payload using a low-density parity-check (LDPC) encoding scheme, wherein the selection of available codeword lengths include a first codeword length, a second codeword length, and a third codeword length, wherein the third codeword length is longer than the second codeword length, which is longer than the first codeword length; and transmitting, from the UWB transmitting device, the payload using one or more codewords having the selected codeword length.

Clause 2. The method of clause 1, wherein, selecting the codeword length comprises: selecting the first codeword length if the number of information bits is less than or equal to half the length of the first codeword length; selecting the second codeword length if the number of information bits is greater than half the length of the first codeword length and less than or equal to half the length of the second codeword length; and selecting the third codeword length in accordance with a codeword length selection scheme.

Clause 3. The method of clause 2 wherein, in accordance with the codeword length selection scheme, the third codeword length is selected if the number of information bits is greater than half the length of the second codeword length.

Clause 4. The method of clause 2 wherein, in accordance with the codeword length selection scheme the third codeword length is selected if the number of information bits is greater than half the length of the second codeword length and less than or equal to half the length of the third codeword length; the second codeword length is further selected if the number of information bits is greater than half the length of the third codeword length and less than or equal to the length of the second codeword length; and the third codeword length is selected if the number of information bits is greater than the length of the second codeword length.

Clause 5. The method of clause 2 wherein, in accordance with the codeword length selection scheme the third codeword length is selected if the number of information bits is greater than half the length of the second codeword length and less than or equal to half the length of the third codeword length; the second codeword length is further selected if the number of information bits is greater than half the length of the third codeword length and less than second codeword length; and if the number of information bits is greater than the second codeword length, the second codeword length or the third codeword length is selected, whichever has a smaller number of parity bits.

Clause 6. The method of any one of clauses 1-5 wherein the number of information bits comprises a frame length or payload length, indicated in a physical (PHY) layer header (PHR), wherein the frame length or payload length represents: a number of information octets, or an equivalent number of information bits, from a medium access control (MAC) layer, or an entire physical layer protocol data unit (PPDU) length from a PHY layer.

Clause 7. The method of any one of clauses 1-6 wherein transmitting the payload using the selected codeword length comprising encoding the payload using a plurality of codewords having the selected codeword length such that: shortened bits are evenly distributed among the codewords of the plurality of codewords, or shortened bits are all included in the first codeword or the last codeword of the plurality of codewords.

Clause 8. The method of any one of clauses 1-7 wherein the first codeword length is 648 bits, the second codeword length is 1296 bits, and the third codeword length is 1944 bits.

Clause 9. A method of ultra-wideband (UWB) communication, the method comprising: receiving, at a receiving UWB device, a payload having one or more codewords transmitted via UWB communication by a transmitting UWB device, the payload having a number of information bits; selecting, at the receiving UWB device and based on the number of information bits, a codeword length from a selection of available codeword lengths with which to decode the payload using a low-density parity-check (LDPC) decoding scheme, wherein the selection of available codeword lengths include a first codeword length, a second codeword length, and a third codeword length, wherein the third codeword length is longer than the second codeword length, which is longer than the first codeword length; and decoding, with the receiving UWB device, the payload using the selected codeword length.

Clause 10. The method of clause 9, wherein selecting the codeword length comprises: selecting the first codeword length if the number of information bits is less than or equal to half the length of the first codeword length; selecting the second codeword length if the number of information bits is greater than half the length of the first codeword length and less than or equal to half the length of the second codeword length; and selecting the third codeword length in accordance with a codeword length selection scheme.

Clause 11. The method of clause 10 wherein, in accordance with the codeword length selection scheme, the third codeword length is selected if the number of information bits is greater than half the length of the second codeword length.

Clause 12. The method of clause 10 wherein, in accordance with the codeword length selection scheme the third codeword length is selected if the number of information bits is greater than half the length of the second codeword length and less than or equal to half the length of the third codeword length; the second codeword length is further selected if the number of information bits is greater than half the length of the third codeword length and less than or equal to the length of the second codeword length; and the third codeword length is selected if the number of information bits is greater than the length of the second codeword length.

Clause 13. The method of clause 10 wherein, in accordance with the codeword length selection scheme the third codeword length is selected if the number of information bits is greater than half the length of the second codeword length and less than or equal to half the length of the third codeword length; and the second codeword length is further selected if the number of information bits is greater than half the length of the third codeword length and less than second codeword length; and if the number of information bits is greater than the second codeword length, the second codeword length or the third codeword length is selected, whichever has a smaller number of parity bits.

Clause 14. The method of any one of clauses 9-13 wherein the number of information bits comprises a frame length or payload length, indicated in a physical (PHY) layer header (PHR), wherein the frame length or payload length represents: a number of information octets, or an equivalent number of information bits, from a medium access control (MAC) layer, or an entire physical layer protocol data unit (PPDU) length from a PHY layer.

Clause 15. The method of any one of clauses 9-14 wherein decoding the payload using the selected codeword length comprising decoding the payload using a plurality of codewords having the selected codeword length such that: shortened bits are evenly distributed among the codewords of the plurality of codewords, or shortened bits are all included in the first codeword or the last codeword of the plurality of codewords.

Clause 16. The method of any one of clauses 9-15 wherein the first codeword length is 648 bits, the second codeword length is 1296 bits, and the third codeword length is 1944 bits.

Clause 17. A transmitting ultra-wideband (UWB) device, comprising: a transceiver; a memory; and one or more processors communicatively coupled with the transceiver and the memory, wherein the one or more processors are configured to: determine a number of information bits of a payload to communicate via UWB; select, based on the number of information bits, a codeword length from a selection of available codeword lengths with which to encode the payload using a low-density parity-check (LDPC) encoding scheme, wherein the selection of available codeword lengths include a first codeword length, a second codeword length, and a third codeword length, wherein the third codeword length is longer than the second codeword length, which is longer than the first codeword length; and transmit, via the transceiver, the payload using one or more codewords having the selected codeword length.

Clause 18. The transmitting UWB device of clause 17, wherein, to select the codeword length, the one or more processors are configured to: select the first codeword length if the number of information bits is less than or equal to half the length of the first codeword length; select the second codeword length if the number of information bits is greater than half the length of the first codeword length and less than or equal to half the length of the second codeword length; and select the third codeword length in accordance with a codeword length selection scheme.

Clause 19. The transmitting UWB device of clause 18 wherein, in accordance with the codeword length selection scheme, the one or more processors are configured to select the third codeword length if the number of information bits is greater than half the length of the second codeword length.

Clause 20. The transmitting UWB device of clause 18 wherein, in accordance with the codeword length selection scheme, the one or more processors are configured to select the third codeword length if the number of information bits is greater than half the length of the second codeword length and less than or equal to half the length of the third codeword length; further select the second codeword length if the number of information bits is greater than half the length of the third codeword length and less than or equal to the length of the second codeword length; and further select the third codeword length if the number of information bits is greater than the length of the second codeword length.

Clause 21. The transmitting UWB device of clause 18 wherein, in accordance with the codeword length selection scheme, the one or more processors are configured to select the third codeword length if the number of information bits is greater than half the length of the second codeword length and less than or equal to half the length of the third codeword length; further select the second codeword length if the number of information bits is greater than half the length of the third codeword length and less than second codeword length; and if the number of information bits is greater than the second codeword length, select the second codeword length or the third codeword length, whichever has a smaller number of parity bits.

Clause 22. The transmitting UWB device of any one of clauses 17-21 wherein the number of information bits comprises a frame length or payload length, indicated in a physical (PHY) layer header (PHR), wherein the frame length or payload length represents: a number of information octets, or an equivalent number of information bits, from a medium access control (MAC) layer, or an entire physical layer protocol data unit (PPDU) length from a PHY layer.

Clause 23. The transmitting UWB device of any one of clauses 17-22 wherein, to transmit the payload using the selected codeword length, the one or more processors are configured to encode the payload using a plurality of codewords having the selected codeword length such that shortened bits are evenly distributed among the codewords of the plurality of codewords, or shortened bits are all included in the first codeword or the last codeword of the plurality of codewords.

Clause 24. The transmitting UWB device of any one of clauses 17-23 wherein the first codeword length is 648 bits, the second codeword length is 1296 bits, and the third codeword length is 1944 bits.

Clause 25. A receiving ultra-wideband (UWB) device comprising: a transceiver; a memory; and one or more processors communicatively coupled with the transceiver and the memory, wherein the one or more processors are configured to: receive, via the transceiver, a payload having one or more codewords transmitted via UWB communication by a transmitting UWB device, the payload having a number of information bits; select, based on the number of information bits, a codeword length from a selection of available codeword lengths with which to decode the payload using a low-density parity-check (LDPC) decoding scheme, wherein the selection of available codeword lengths include a first codeword length, a second codeword length, and a third codeword length, wherein the third codeword length is longer than the second codeword length, which is longer than the first codeword length; and decode the payload using the selected codeword length.

Clause 26. The receiving UWB device of clause 25, wherein, to select the codeword length, the one or more processors are configured to: select the first codeword length if the number of information bits is less than or equal to half the length of the first codeword length; select the second codeword length if the number of information bits is greater than half the length of the first codeword length and less than or equal to half the length of the second codeword length; and select the third codeword length in accordance with a codeword length selection scheme.

Clause 27. The receiving UWB device of clause 26 wherein, in accordance with the codeword length selection scheme, the one or more processors are configured to select the third codeword length if the number of information bits is greater than half the length of the second codeword length.

Clause 28. The receiving UWB device of clause 26 wherein, in accordance with the codeword length selection scheme, the one or more processors are configured to select the third codeword length if the number of information bits is greater than half the length of the second codeword length and less than or equal to half the length of the third codeword length; further select the second codeword length if the number of information bits is greater than half the length of the third codeword length and less than or equal to the length of the second codeword length; and further select the third codeword length if the number of information bits is greater than the length of the second codeword length.

Clause 29. The receiving UWB device of clause 26 wherein, in accordance with the codeword length selection scheme, the one or more processors are configured to select the third codeword length if the number of information bits is greater than half the length of the second codeword length and less than or equal to half the length of the third codeword length; and further select the second codeword length if the number of information bits is greater than half the length of the third codeword length and less than second codeword length; and if the number of information bits is greater than the second codeword length, select the second codeword length or the third codeword length, whichever has a smaller number of parity bits.

Clause 30. The receiving UWB device of any one of clauses 25-29 wherein the number of information bits comprises a frame length or payload length, indicated in a physical (PHY) layer header (PHR), wherein the frame length or payload length represents: a number of information octets, or an equivalent number of information bits, from a medium access control (MAC) layer, or an entire physical layer protocol data unit (PPDU) length from a PHY layer.

Clause 31. The receiving UWB device of any one of clauses 25-30 wherein, to decode the payload using the selected codeword length, the one or more processors are configured to decode the payload using a plurality of codewords having the selected codeword length such that shorten bits are evenly distributed among the codewords of the plurality of codewords, or shorten bits are all included in the first codeword or the last codeword of the plurality of codewords.

Clause 32. The receiving UWB device of any one of clauses 25-31 wherein the first codeword length is 648 bits, the second codeword length is 1296 bits, and the third codeword length is 1944 bits.

Clause 33. An apparatus having means for performing the method of any one of clauses 1-16.

Clause 34. A non-transitory computer-readable medium storing instructions, the instructions comprising code for performing the method of any one of clauses 1-16.

What is claimed is:

1. A method of ultra-wideband (UWB) communication, the method comprising:
    determining, at a transmitting UWB device, a number of information bits of a payload to communicate via UWB;
    selecting, at the transmitting UWB device and based on the number of information bits, a plurality of codewords having a codeword length from a selection of an available number of codewords and available codeword lengths with which to encode the payload using a low-density parity-check (LDPC) encoding scheme, wherein the selection of the available number of codewords and the available codeword lengths include a single codeword having a first codeword length, a maximum of two codewords each having a second codeword length, and at least one codeword each having a third codeword length, wherein the third codeword length is longer than the second codeword length, which is longer than the first codeword length; and
    transmitting, from the UWB transmitting device, the payload using the selected plurality of codewords having the selected codeword length, wherein the payload is encoded using the plurality of codewords having the selected codeword length such that shortened bits are evenly distributed among codewords of the plurality of codewords.

2. The method of claim 1, wherein the number of information bits comprises a frame length or payload length, indicated in a physical (PHY) layer header (PHR), wherein the frame length or payload length represents:
    a number of information octets, or an equivalent number of information bits, from a medium access control (MAC) layer, or
    an entire physical layer protocol data unit (PPDU) length from a PHY layer.

3. The method of claim 1, wherein:
    the first codeword length is 648 bits,
    the second codeword length is 1296 bits, and
    the third codeword length is 1944 bits.

4. The method of claim 1, wherein selecting the number of codewords having the codeword length comprises:

selecting a single codeword having the first codeword length if the number of information bits is less than or equal to a first threshold length;

selecting a single codeword having the second codeword length if the number of information bits is greater than the first threshold length and less than or equal to a second threshold length;

selecting a single codeword having the third codeword length if the number of information bits is greater than the second threshold length and less than or equal to a third threshold length;

selecting two codewords each having the second codeword length if the number of information bits is greater than the third threshold length and less than or equal to a fourth threshold length; and selecting multiple codewords each having the third codeword length if the number of information bits is greater than the fourth threshold length.

5. The method of claim 1, wherein the shortened bits are zero-padded bits that are removed before transmitting the payload.

6. A method of ultra-wideband (UWB) communication, the method comprising:

receiving, at a receiving UWB device, a payload having one or more codewords transmitted via UWB communication by a transmitting UWB device, the payload having a number of information bits;

selecting, at the receiving UWB device and based on the number of information bits, a plurality of codewords having a codeword length from a selection of an available number of codewords and available codeword lengths with which to decode the payload using a low-density parity-check (LDPC) decoding scheme, wherein the selection of the available number of codewords and the available codeword lengths include a single codeword having a first codeword length, a maximum of two codewords each having a second codeword length, and at least one codeword having a third codeword length, wherein the third codeword length is longer than the second codeword length, which is longer than the first codeword length; and decoding, with the receiving UWB device, the payload using the selected plurality of codewords having the selected codeword length, wherein the payload is decoded using the plurality of codewords having the selected codeword length such that shortened bits are evenly distributed among codewords of the plurality of codewords.

7. The method of claim 6, wherein the number of information bits comprises a frame length or payload length, indicated in a physical (PHY) layer header (PHR), wherein the frame length or payload length represents:

a number of information octets, or an equivalent number of information bits, from a medium access control (MAC) layer, or an entire physical layer protocol data unit (PPDU) length from a PHY layer.

8. The method of claim 6, wherein:
the first codeword length is 648 bits,
the second codeword length is 1296 bits, and
the third codeword length is 1944 bits.

9. The method of claim 6, wherein selecting the number of codewords having the codeword length comprises:

selecting a single codeword having the first codeword length if the number of information bits is less than or equal to a first threshold length;

selecting a single codeword having the second codeword length if the number of information bits is greater than the first threshold length and less than or equal to a second threshold length;

selecting a single codeword having the third codeword length if the number of information bits is greater than the second threshold length and less than or equal to a third threshold length;

selecting two codewords each having the second codeword length if the number of information bits is greater than the third threshold length and less than or equal to a fourth threshold length; and selecting multiple codewords each having the third codeword length if the number of information bits is greater than the fourth threshold length.

10. A transmitting ultra-wideband (UWB) device, comprising:

a transceiver;
at least one memory; and
one or more processors communicatively coupled with the transceiver and the at least one memory, wherein the one or more processors are configured to:

determine a number of information bits of a payload to communicate via UWB;

select, based on the number of information bits, a plurality of codewords having a codeword length from a selection of an available number of codewords and available codeword lengths with which to encode the payload using a low-density parity-check (LDPC) encoding scheme, wherein the selection of the available number of codewords and the available codeword lengths include a single codeword having a first codeword length, a maximum of two codewords each having a second codeword length, and at least one codeword having a third codeword length, wherein the third codeword length is longer than the second codeword length, which is longer than the first codeword length; and transmit, via the transceiver, the payload using the selected plurality of codewords having the selected codeword length, wherein the payload is encoded using the plurality of codewords having the selected codeword length such that shortened bits are evenly distributed among codewords of the plurality of codewords.

11. The transmitting UWB device of claim 10, wherein the number of information bits comprises a frame length or payload length, indicated in a physical (PHY) layer header (PHR), wherein the frame length or payload length represents:

a number of information octets, or an equivalent number of information bits, from a medium access control (MAC) layer, or an entire physical layer protocol data unit (PPDU) length from a PHY layer.

12. The transmitting UWB device of claim 10, wherein:
the first codeword length is 648 bits,
the second codeword length is 1296 bits, and
the third codeword length is 1944 bits.

13. The transmitting UWB device of claim 10, wherein, to select the number of codewords having the codeword length, the one or more processors are configured to:

select a single codeword having the first codeword length if the number of information bits is less than or equal to a first threshold length;

select a single codeword having the second codeword length if the number of information bits is greater than the first threshold length and less than or equal to a second threshold length;

select a single codeword having the third codeword length if the number of information bits is greater than the second threshold length and less than or equal to a third threshold length;

select two codewords each having the second codeword length if the number of information bits is greater than the third threshold length and less than or equal to a fourth threshold length; and select multiple codewords each having the third codeword length if the number of information bits is greater than the fourth threshold length.

14. The transmitting UWB device of claim 10, wherein the shortened bits are zero-padded bits that are removed before transmission of the payload.

15. A receiving ultra-wideband (UWB) device comprising:

a transceiver;

at least one memory; and one or more processors communicatively coupled with the transceiver and the at least one memory, wherein the one or more processors are configured to:

receive, via the transceiver, a payload having one or more codewords transmitted via UWB communication by a transmitting UWB device, the payload having a number of information bits;

select, based on the number of information bits, a plurality of codewords having a codeword length from a selection of an available number of codewords and available codeword lengths with which to decode the payload using a low-density parity-check (LDPC) decoding scheme, wherein the selection of the available number of codewords and available codeword lengths include a single codeword having a first codeword length, a maximum of two codewords each having a second codeword length, and at least one codeword each having a third codeword length, wherein the third codeword length is longer than the second codeword length, which is longer than the first codeword length; and decode the payload using the selected plurality of codewords having the selected codeword length, wherein the payload is decoded using the plurality of codewords having the selected codeword length such that shortened bits are evenly distributed among codewords of the plurality of codewords.

16. The receiving UWB device of claim 15, wherein the number of information bits comprises a frame length or payload length, indicated in a physical (PHY) layer header (PHR), wherein the frame length or payload length represents:

a number of information octets, or an equivalent number of information bits, from a medium access control (MAC) layer, or an entire physical layer protocol data unit (PPDU) length from a PHY layer.

17. The receiving UWB device of claim 15, wherein:

the first codeword length is 648 bits, the second codeword length is 1296 bits, and the third codeword length is 1944 bits.

18. The receiving UWB device of claim 15, wherein, to select the number of codewords having the codeword length, the one or more processors are configured to:

select a single codeword having the first codeword length if the number of information bits is less than or equal to a first threshold length;

select a single codeword having the second codeword length if the number of information bits is greater than the first threshold length and less than or equal to a second threshold length;

select a single codeword having the third codeword length if the number of information bits is greater than the second threshold length and less than or equal to a third threshold length;

select two codewords each having the second codeword length if the number of information bits is greater than the third threshold length and less than or equal to a fourth threshold length; and select multiple codewords each having the third codeword length if the number of information bits is greater than the fourth threshold length.

* * * * *